United States Patent [19]

Mayer

[11] Patent Number: 4,687,386
[45] Date of Patent: Aug. 18, 1987

[54] APPARATUS FOR PERFORMING MACHINING OPERATIONS IN POORLY ACCESSIBLE LOCATIONS

[76] Inventor: Hans G. Mayer, Telemastr. 5, 2000 Hamburg 19, Fed. Rep. of Germany

[21] Appl. No.: 734,733

[22] Filed: May 16, 1985

Related U.S. Application Data

[63] Continuation-in-part of Ser. No. 440,438, Nov. 9, 1982, abandoned.

[30] Foreign Application Priority Data

Nov. 11, 1981 [DE] Fed. Rep. of Germany ..... 31329[U]

[51] Int. Cl.⁴ ............................................. B23B 39/00
[52] U.S. Cl. ...................................... 408/88; 408/95; 408/112
[58] Field of Search ................. 408/16, 72 R, 95, 114, 408/115 R, 112, 88, 241 G, 237, 241 S, 14, 99, 100, 79; 145/129; 33/185, 189, 42, 44

[56] References Cited

U.S. PATENT DOCUMENTS

| | | | |
|---|---|---|---|
| 595,896 | 12/1897 | Van Dusen et al. | 408/79 L |
| 639,203 | 12/1899 | Woodill et al. | 408/100 X |
| 704,657 | 7/1902 | McClellan | 408/99 |
| 894,228 | 7/1908 | Price | 408/79 |
| 914,759 | 3/1909 | Signor | 408/100 |
| 960,097 | 5/1910 | Keithley et al. | 408/88 |
| 973,136 | 10/1910 | Ogle | 408/114 |
| 1,011,098 | 12/1911 | Washburn | 408/100 |
| 1,343,370 | 6/1920 | LeSueur | 408/100 |
| 1,517,987 | 12/1924 | Henderson | 408/114 |
| 3,060,769 | 10/1962 | Heider | 408/99 X |
| 3,679,320 | 7/1972 | Bohorquez et al. | 408/111 X |
| 3,741,671 | 6/1973 | Douglass | 408/237 |
| 3,781,999 | 1/1974 | Colangelo | 33/185 R |
| 4,281,949 | 8/1981 | Bugarin | 408/241 R |
| 4,403,892 | 9/1983 | Kane | 408/95 |

Primary Examiner—William R. Briggs
Attorney, Agent, or Firm—Browdy and Neimark

[57] ABSTRACT

An apparatus for performing machining operations in poorly accessible locations includes a fastening head, which is held at one end of a shaft stub, while the other end is in engagement via a bevel gear drive with a drive shaft which is retained in a longitudinal housing. A longitudinally displaceable telescopic guide is provided on the longitudinal housing at right angles thereto. The telescopic guide is compressible counter to the pressure of a spring. A micrometer screw is provided for fine adjustment of the distance between the fastening head and the telescopic guide.

13 Claims, 5 Drawing Figures

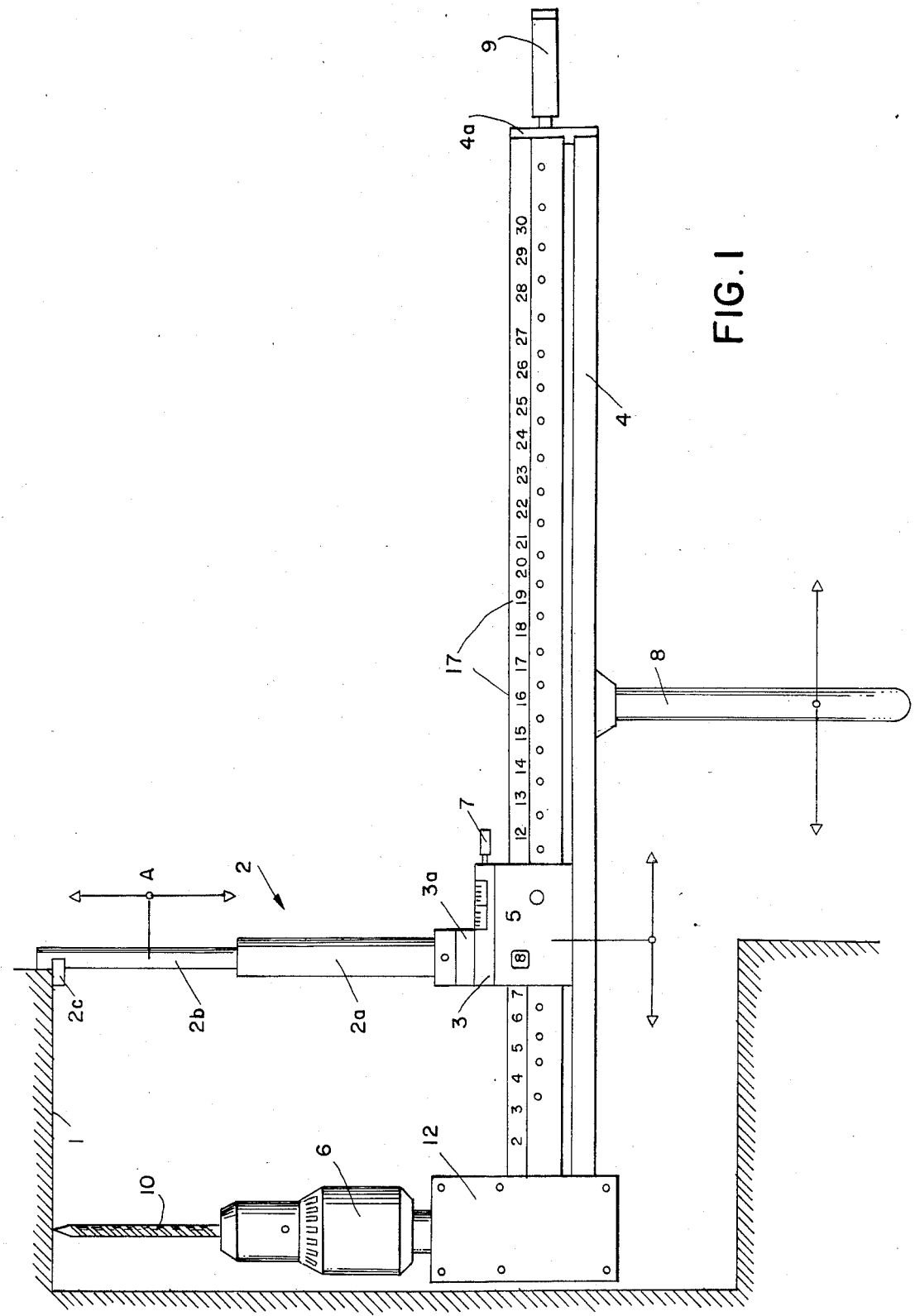

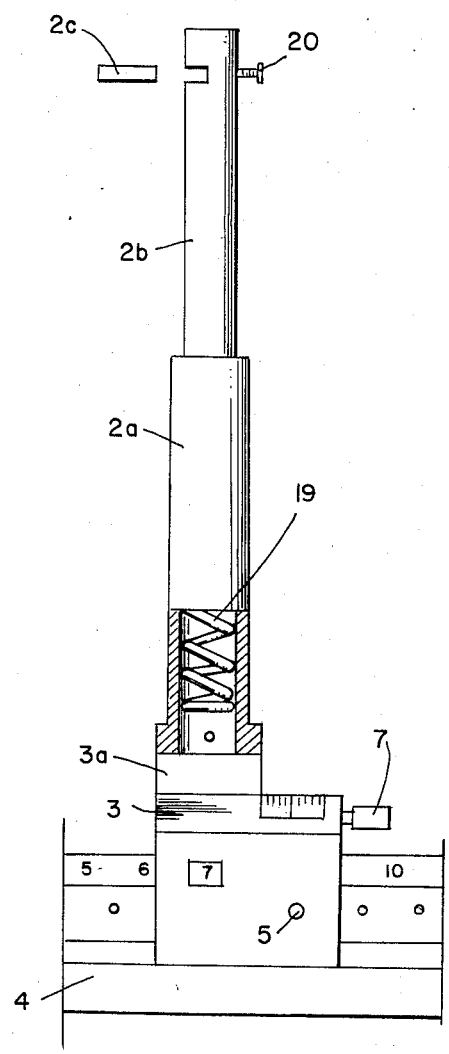
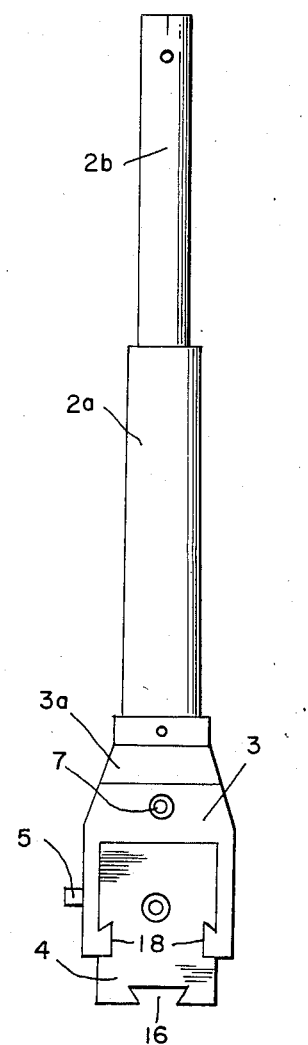

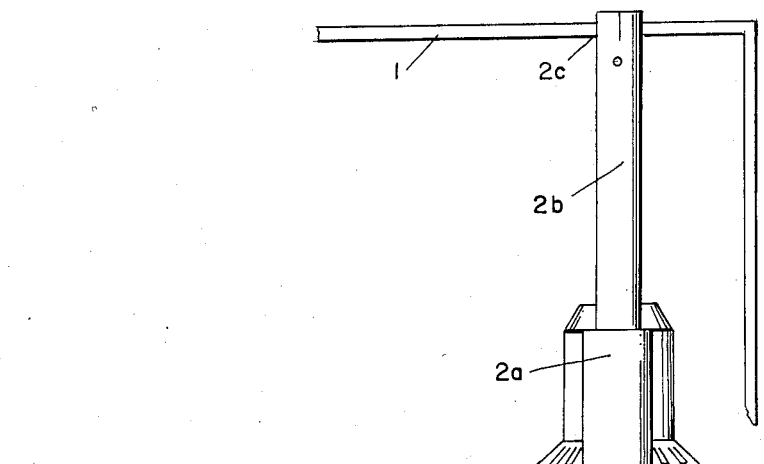
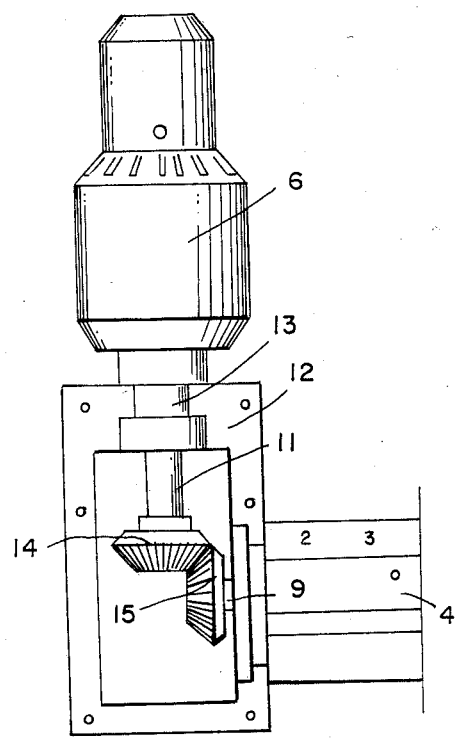
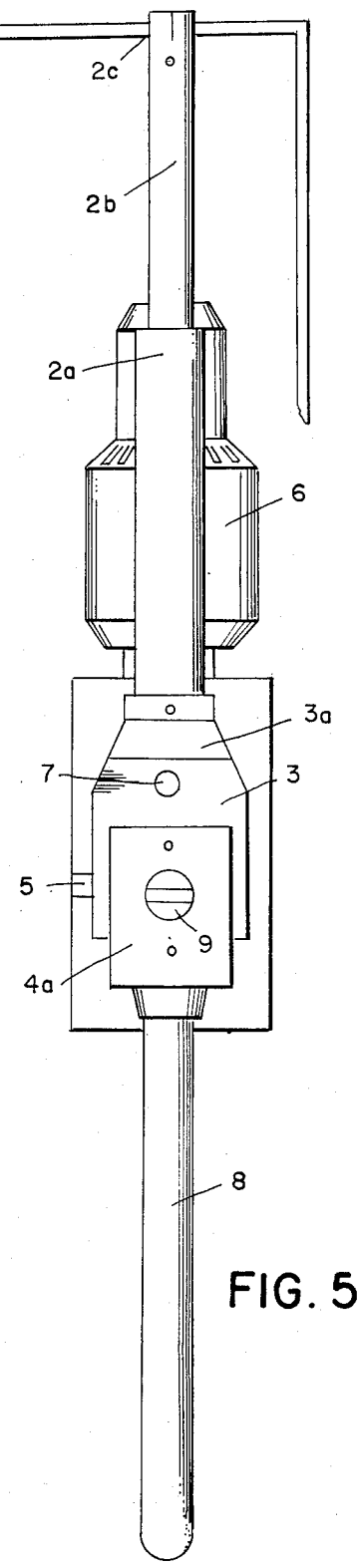
FIG. 4
FIG. 5

4,687,386

APPARATUS FOR PERFORMING MACHINING OPERATIONS IN POORLY ACCESSIBLE LOCATIONS

CROSS REFERENCE TO RELATED APPLICATIONS

This application is a continuation-in-part of U.S. Ser. No. 440,438 filed Nov. 9, 1982 now abandoned.

FIELD OF THE INVENTION

The present invention relates to an apparatus for performing machining operations in niches or crevices located behind, above or below obstacles, that is, in locations that are inaccessible for standard machining tools.

BACKGROUND OF THE INVENTION

Conventional machining tools, such as drilling machines, are very long in the lengthwise dimension of the drill when it is fastened in place, and they do not enable drilling a hole, for instance, in such locations as those described above.

SUMMARY OF THE INVENTION

It is accordingly the object of the present invention to provide an apparatus which makes it possible to perform various machining operations, such as drilling, grinding, and polishing, in such inaccessible locations, which cannot be reached using standard equipment.

Another object of the present invention is to provide an apparatus of the type described which is light-weight and easily transported, for example by hand from one machining location to another.

Yet another object of the invention to provide a simple bore or a threaded bore to accurate dimensions even in locations that are impossible to see with the eye.

Furthermore, according to the invention it should be possible to produce a bore in a poorly accessible location without tilting of the drilling tool.

This object is attained in accordance with the invention by means of the characteristics of the main claim, and preferred forms of embodiment of the invention are attained by means of the characteristics of the dependent claims.

According to the invention, the apparatus for performing machining operations in poorly accessible locations includes a fastening head for receiving the tool, with the head being connected via a bevel gear drive with a drive shaft guided in a longitudinal housing. The end of the drive shaft can be clamped into the fastening head of a drive machine, and a telescopic guide is provided on the longitudinal housing for the drive shaft. The telescopic guide is at a right angle to the drive shaft and is displaceable in the longitudinal direction of the housing, i.e. along the axis of the housing.

In the lengthwise direction, for instance along the length of a drill fastened into place, this apparatus has only a short length, so that it can be used in extremely tight and poorly accessible locations, such as behind, above or below obstacles. A conventional drive machine, for instance a drilling machine, can be connected to the drive shaft, so that the invention represents a piece of simply structured supplementary equipment for a drilling machine. Besides the drill, grinding or polishing equipment can also be fastened into the fastening head, so that various operations can be performed in the poorly accessible locations.

The telescopic guide is preferably displaceable counter to the pressure of a spring. This provision makes it possible to guide the drill fastened into the fastening head in a precisely proportioned and tilt-free manner. The telescopic guide, which has a stop shoulder at its outer end, is displaceable in the longitudinal direction of the housing and can be fixed thereto via an adjusting screw. The longitudinal housing is provided with a scale which indicates the distance of the telescopic guide from the central axis of the fastening head. This distance can accordingly be set precisely, so that a bore can be produced to accurate dimensions even in locations the operator of the tool cannot actually see with his eye. So that this distance can be adjusted accurately, a micrometer screw is provided for fine adjustment.

The apparatus may be held using a handle, which is guided along the longitudinal housing. The handle can be locked in any arbitrary position. The longitudinal housing has a simple structure, in two parts longitudinally, and is correspondingly inexpensive to manufacture.

BRIEF DESCRIPTION OF THE DRAWINGS

Further advantages, details and characteristics of the invention will become apparent from the ensuing description of a preferred embodiment of the apparatus according to the invention, taken in conjunction with the accompanying drawings in which:

FIG. 1 is a front view of the apparatus according to the invention;

FIG. 2 is a front view of the telescopic guide, partically cut away, on a larger scale;

FIG. 3 is a side view of the telescopic guide shown in FIG. 2;

FIG. 4 is a front view of the fastening head of the apparatus with the housing cut away, in order to show the bevel gear drive; and FIG. 5 is a side view of the apparatus according to FIG. 1.

DESCRIPTION OF THE PREFERRED EMBODIMENT

The apparatus shown in FIG. 1 represents a portable specialized tool, one not bound to an assigned location, which can be connected to a conventional drive machine, such as a drilling machine available in commerce, so as to produce bores in inaccessible locations and also to perform other machining operations for which rotation is a suitable type of drive.

A conventional fastening head 6 bears a drill 10 by way of example in the present case, by means of which a bore is to be produced in a poorly accessible locations, such as a niche in a article 1. As shown in FIG. 4, the fastening head 6 is retained on the end of a shaft stub 11, which is guided inside the wall of a housing 12 by means of a bearing 13. On the end of the shaft stub 11 opposite the fastening head 6, a bevel gear 14 is held in place, meshing with a further bevel gear 15, which is secured on the end of a drive shaft 9 positioned at a right angle to the shaft stub 11.

The drive shaft 9 is disposed inside a longitudinal housing 4 and at the end protrudes outward beyond this housing, so that the projecting portion of the drive shaft 9 can be received by the fastening head (not shown) of the drive machine, for instance a hand drilling machine.

FIG. 3 shows an end view of the longitudinal housing 4. On its underside, the longitudinal housing 4 has a dovetail groove 16 for slidably receiving a handle 8 (not shown here but which is visible in FIGS. 1 and 5) which is displaceable and adjustable in the longitudinal direction of the housing 4.

The longitudinal housing 4 is furthermore provided with a scale 17, the purpose of which will be descibed later.

As clearly shown in FIG. 3, the longitudinal housing 4 has further grooves 18 on its front and back for slidably receiving a slide 3, which can be fixed in terms of its sliding movement relative to the longitudinal housing 4 by means of an adjusting screw 5. The slide 3 is provided on its top with a further groove, upon which a micrometer slide 3a is mounted. The micrometer slide 3a can be adjusted relative to the slide 3 via a micrometer screw 7.

A telescopic guide 2 is secured to the micrometer slide 3a and is oriented at right angles to the longitudinal axis of the housing 4. The telescopic guide 2 comprises two parts 2a and 2b that can be telescoped one inside the other; as shown particularly in FIG. 2, the telescopic part 2b is subject to an outwardly exerted pressure of the spring 19. On its outer end, the telescopic part 2b has a stop or shoulder 2c, which is held via a screw 20 and is supported on the workpiece or structural part that is to be machined.

On the outer end of the longitudinal housing 4, a cover plate 4a that covers the grooves 16 and 18 is retained via screws, in order to prevent unintentional slipping of the handle 8 or slide 3.

An apparatus is thereby provided, by means of which bores can be drilled or other machining operations can be performed in poorly accessible locations, as will be explained in further detail below.

If the bore is to be made in the top, bottom or side of a niche in a wall, for example, spaced apart by a predetermined distance from the edge of the niche, then first the slide 3 is displaced along the longitudinal housing 4, using the scale 17, which indicates the distance from the central axis of the fastening head 6. Fine adjustment can be attained using the micrometer screw 7, by means of which the micrometer slide 3a is adjusted relative to the slide 3.

Now the shoulder 2c is positioned at the edge of the niche, and with the motor actuated the apparatus is pressed in a direction toward the surface of the niche or wall, into which the bore is to be drilled (indicated by the arrow A), whereupon the bore is produced at the intended location with high precision. The telescopic part 2b is displaced into the telescopic part 2a counter to the pressure of the spring 19. Because of the telescopic guidance, tilting of the drill 10, about the direction in which the apparatus is pressed, is reliably prevented.

Once the telescopic guide 2 is removed by withdrawing it from the grooves of the longitudinal housing 4, the apparatus can be put to use for rough operations of the most diverse kind. As with conventional hand drilling machines, compass saws, steel brushes, grinding wheels and the like can be clamped into the fastening head 6.

Finally, the part 2b of the telescopic guide 2 can also be provided with a scale, which indicates the depth to which a drill 10 fastened in the fastening head 6 is inserted.

It should expressly be noted again that the foregoing description addresses merely a preferred exemplary embodiment, and that various alternations and modificationss may be made without departing from the scope of the inventon.

What is claimed is:

1. An apparatus for performing machinery operations on a work surface within a niche or crevice constituting a poorly accessible location, comprising
   a fastening head for receiving a machining tool for rotation about a first axis;
   a drive shaft having a second axis located at a right angle from said first axis, said drive shaft having a distal end which is fastenable to a drive machine;
   bevel gear means for rotatably connecting said fastening head to said drive shaft;
   a longitudinal housing for said drive shaft extending along the axial length of said drive shaft and providing guiding means therefor;
   a spring urged telescopic guide extending from said longitudinal housing at a right angle from said drive shaft, said telescoping guide telescoping in a direction along said first axis, said telescopic guide having a distal end;
   means for displaceably mounting said telescopic guide on said housing and for fixedly locating said telescopic guide at a selected location along the length of said housing from said fastening head; and
   support means, located at said distal end of said telescopic guide, for abuttingly bracing said apparatus against the work surface to be machined without attachment thereto,
   wherein said telescoping of said telescopic guide allows advancement of the apparatus in the direction of said first axis as said work surface is machined by said machining tool.

2. An apparatus according to claim 1 wherein said support means for bracing said apparatus against the work surface to be machined comprises a shoulder affixed to the distal end of said telescoping guide.

3. An apparatus according to claim 1 wherein said means for displaceably mounting said telescopic guide on said housing comprises a dove tail guide.

4. An apparatus according to claim 1 further comprising an exterior scale on said longitudinal housing for accurately determining the distance of said telescopic guide from said fastening head.

5. An apparatus according to claim 1 wherein said means for fixedly locating said telescopic guide at a selected location along the length of said housing from said fastening head comprises an adjusting screw.

6. An apparatus according to claim 1 wherein said means for displaceably mounting said telescopic guide on said housing and for fixably locating said telescopic guide at a selected location along the length of said housing from said fastening head comprises a dove tail guide and an adjusting screw.

7. An apparatus according to claim 1 wherein said means for displaceably mounting said telescopic guide on said housing comprises a slidable mounting block.

8. An apparatus according to claim 7, wherein said telescopic guide is mounted on said slidable mounting block through a fine adjustment means, said fine adjustment means including a micrometer screw for fine adjustment of the distance between said telescopic guide and said fastening head.

9. An apparatus according to claim 1 wherein said telescopic guide comprises a first hollow portion and a second portion which telescopes within said first hollow portion, and distance determining means to indicate the depth into the work surface a machining tool as penetrated, said distance determining means comprising an external side on said second portion.

10. An apparatus according to claim 1 further comprising a handle and means for mounting said handle on said longitudinal housing for displacement along the length thereto.

11. An apparatus according to claim 10 further comprising means for fixing said handle in a selected position along the length of said longitudinal housing.

12. An apparatus according to claim 1 further comprising handle means for manually transporting said apparatus from one location to another.

13. An apparatus for performing machinery operations on a work surface within a niche or crevice constituting a poorly accessible location, comprising a fastening head for receiving a machining tool for rotation about a first axis;

a drive shaft having a second axis located at a right angle from said first axis, said drive shaft having a distal end which is fastenable to a drive machine;

bevel gear means for rotatably connecting said fastening head to said drive shaft;

a longitudinal housing for said drive shaft extending along the axial length of said drive shaft and providing guiding means therefor;

a telescopic guide extending from said longitudinal housing at a right angle from said drive shaft, said telescopic guide having a distal end;

means for displaceably mounting said telescopic guide on said housing and for fixedly locating said telescopic guide at a selected location along the length of said housing from said fastening head; and support means, located at said distal end of said telescoping guide, for abuttingly bracing said apparatus against the work surface to be machined without attachment thereto, wherein said telescopic guide comprises a first hollow portion, a second portion for slidably moving within said hollow first portion, and a compressible spring carried within said first hollow portion and abutting said spring, said spring becoming compressed as said telescopic guide telescopes to become shorter in length.

* * * * *